US012584864B2

(12) United States Patent
Zhang et al.

(10) Patent No.: US 12,584,864 B2
(45) Date of Patent: Mar. 24, 2026

(54) POINT-OF-CARE TESTING (POCT) FULLY-AUTOMATIC CHEMILUMINESCENCE DEVICE BASED ON MULTI-CHANNEL PARALLEL PRETREATMENT TECHNOLOGY

(71) Applicant: Chengdu Illumaxbio Technology Co., LTD, Chengdu (CN)

(72) Inventors: Xingpeng Zhang, Chengdu (CN); Le Chang, Chengdu (CN); Rundan Wei, Chengdu (CN)

(73) Assignee: Chengdu Illumaxbio Technology Co., LTD, Chengdu (CN)

( * ) Notice: Subject to any disclaimer, the term of this patent is extended or adjusted under 35 U.S.C. 154(b) by 655 days.

(21) Appl. No.: 18/097,513

(22) Filed: Jan. 17, 2023

(65) Prior Publication Data

US 2023/0228685 A1      Jul. 20, 2023

(30) Foreign Application Priority Data

Jan. 18, 2022     (CN) .......................... 202210052870.8

(51) Int. Cl.
G01N 21/76          (2006.01)
G01N 35/00          (2006.01)
G01N 35/10          (2006.01)

(52) U.S. Cl.
CPC ......... *G01N 21/76* (2013.01); *G01N 35/0098* (2013.01); *G01N 35/10* (2013.01); *G01N 2035/00465* (2013.01)

(58) Field of Classification Search
None
See application file for complete search history.

(56) References Cited

U.S. PATENT DOCUMENTS

2019/0120752 A1*   4/2019   Tajima ................. G01N 21/272

FOREIGN PATENT DOCUMENTS

| CN | 205665149 U | * | 10/2016 | |
| CN | 110749742 A | * | 2/2020 | ............. G01N 35/00 |
| CN | 113820195 A | * | 12/2021 | ............... B03C 1/30 |

OTHER PUBLICATIONS

Machine-generated English translation of CN 110749742 (Year: 2020).*
Machine generated English translation CN 113820195 (Year: 2021).*
Machin generated English translation of CN 205665149 (Year: 2016).*

* cited by examiner

*Primary Examiner* — P. Kathryn Wright
(74) *Attorney, Agent, or Firm* — Bayramoglu Law Offices LLC

(57) ABSTRACT

A point-of-care testing (POCT) fully-automatic chemiluminescence device based on a multi-channel parallel pretreatment technology includes a support. The support is provided thereon with a reaction chamber assembly, which reciprocates linearly relative to the support. A multi-channel parallel pretreatment assembly and a photomultiplier tube (PMT) assembly are arranged on the support and are located above the reaction chamber assembly. The multi-channel parallel pretreatment assembly is configured to transfer, clean, and separate reagents in reagent strips in the reaction chamber assembly. The PMT assembly is configured to detect a luminescence value of the cleaned and separated reagents.

5 Claims, 5 Drawing Sheets

POINT-OF-CARE TESTING (POCT) FULLY-AUTOMATIC CHEMILUMINESCENCE DEVICE BASED ON MULTI-CHANNEL PARALLEL PRETREATMENT TECHNOLOGY

CROSS REFERENCE TO THE RELATED APPLICATIONS

This application is based upon and claims priority to Chinese Patent Application No. 202210052870.8, filed on Jan. 18, 2022, the entire contents of which are incorporated herein by reference.

TECHNICAL FIELD

The present disclosure relates to the technical field of fully-automatic chemiluminescence equipment and, in particular, to a point-of-care testing (POCT) fully-automatic chemiluminescence device based on a multi-channel parallel pretreatment technology.

BACKGROUND

Fully-automatic chemiluminescence, as a branch of in vitro diagnosis (IVD), has become a dominant testing method in clinical applications due to its high sensitivity, high specificity, high degree of automation, and wide linearity range. It accounts for at least 30% of the entire in-vitro diagnostics market and is growing rapidly. Traditional chemiluminescence instruments supplied by Roche, Abbott, Siemens, and Beckman are all large-scale instruments with a speed of 100 T/H-600 T/H. For most primary hospitals, the space available for storing large-scale testing equipment is limited, and the amount of samples is limited, resulting in low use efficiency and high maintenance costs for such large-scale instruments. In addition, reagents are usually packaged in 100 servings per box, and once opened, they should be used up within a short period of time, otherwise, they will lose efficacy and become a waste. Existing point-of-care testing (POCT) is generally based on the principle of chromatography, which has insufficient testing sensitivity and low precision and can only be used for some immune tests. Existing POCT chemiluminescence instruments launched by some manufacturers have low magnetic separation efficiency, which results in large errors between channels. In addition, a sample is required to be added manually. FullFall automation cannot be achieved, thereby affecting testing efficiency. Therefore, a small and sophisticated chemiluminescence instrument is urgently needed.

SUMMARY

Given the above problems in the prior art, the present disclosure provides a point-of-care testing (POCT) fully-automatic chemiluminescence device based on a multi-channel parallel pretreatment technology. The present disclosure supports single-serving reagents and features a small volume, no liquid passage, automatic sample addition, and high sensitivity and precision comparable to those of a large-scale chemiluminescence device.

To achieve the above objective, the present disclosure adopts the following technical solution:

The POCT fully-automatic chemiluminescence device based on a multi-channel parallel pretreatment technology includes a support that is provided thereon with a reaction chamber assembly, which is configured to accommodate reagent strips and reciprocates linearly relative to the support.

A multi-channel parallel pretreatment assembly and a photomultiplier tube (PMT) assembly are sequentially arranged on the support from front to back and are located above the reaction chamber assembly.

The multi-channel parallel pretreatment assembly is configured to transfer, clean, and separate reagents in the reagent strip in the reaction chamber assembly. The reaction chamber assembly transfers the cleaned and separated reagents to the PMT assembly. The PMT assembly is configured to detect a luminescence value of the cleaned and separated reagents.

Further, as a specific implementation of the reaction chamber assembly, the reaction chamber assembly includes a guide rail provided at a bottom of the support. Two sides of the guide rail are respectively provided with a reaction chamber stepping motor and a base, which are fixedly connected to the support.

An output end of the reaction chamber stepping motor is provided thereon with a reaction chamber driving pulley, and the base is rotatably provided thereon with a reaction chamber driven pulley. The reaction chamber driving pulley is connected to the reaction chamber driven pulley through a belt.

The guide rail is provided thereon with a reaction chamber body. The bottom of the reaction chamber body is provided with a reaction chamber slider that is connected to the guide rail in a slidable manner. The side wall of the reaction chamber body is provided with a first synchronous belt pressing plate in contact with the belt. The belt drives the reaction chamber body to slide along the length direction of the guide rail through the first synchronous belt pressing plate.

The reaction chamber stepping motor drives the belt to linearly reciprocate on the reaction chamber driving pulley and the reaction chamber driven pulley through a PMT driving pulley and a PMT driven pulley. The linearly reciprocating belt is in contact with the first synchronous belt pressing plate to drive the reaction chamber body to reciprocate slidably on the base. The reaction chamber stepping motor is controlled to drive the reaction chamber body to a designated position to drive the reagent strip in the reaction chamber body to move to a position where the multi-channel parallel pretreatment assembly is located. This design facilitates a tip head to take a liquid and improves testing efficiency.

A photoelectric switch is provided on the bottom of the support and is configured to detect the position of the reaction chamber body. A heating plate is provided at the bottom of the reaction chamber body and heats at a constant temperature of 37° C. The heating plate keeps the temperature in the reaction chamber body constant to the preset value, such that the reagent or solvent in the reagent strip meets the temperature condition for chemiluminescence measurement.

Further, as a specific implementation of the reagent strip, the reagent strips each are provided with a handle, a tip head, a disposable magnetic separation sleeve, and a disposable film breaking piece arranged beside the handle. The reagent strips each are provided with a first diluent hole, a second diluent hole, a magnetic bead hole, a first reagent hole, a second reagent hole, a third reagent hole, a first cleaning solution hole, a second cleaning solution hole, a third cleaning solution hole, a fourth cleaning solution hole, and a substrate reading hole side by side.

Further, the multi-channel parallel pretreatment assembly includes a magnetic separation and transfer device configured to perform separation and transfer and a first drive device configured to drive the magnetic separation and transfer device to move.

The magnetic separation and transfer device includes a second mounting bracket fixedly connected to the support. The second mounting bracket is provided therein with an injector chamber. A first mounting plate is provided above the top of the injector chamber and is provided with piston rods that are connected to the injector chamber in a movable and sealing manner. The second mounting bracket is further provided with a second drive device configured to drive the first mounting plate to linearly reciprocate in a vertical direction.

The injector chamber is provided with loading heads, which are configured to load tip heads or magnetic separation sleeves and have a hollow structure. The free ends of the piston rods are fixedly connected to magnetic rods that are configured to adsorb magnetic beads in a magnetic particle reagent. The second drive device can drive the magnetic rods on the piston rods to pass through the loading heads.

Further, the first drive device includes a first mounting bracket, which is provided with a first motor. An output end of the first motor is provided with a first drive screw. The first mounting bracket is further vertically provided with a first linear guide rail. The first linear guide rail is connected to a slider in a slidable manner. The slider is fixedly connected to the second mounting bracket. The first drive screw is connected to the slider in a threaded manner.

The second drive device includes a second motor provided on the second mounting bracket. An output end of the second motor is provided with a second drive screw, which is connected to the first mounting plate in a threaded manner. The injector chamber is vertically and fixedly provided with a second linear guide rail that is connected to the first mounting plate in a slidable manner.

Multiple piston rods are provided and are evenly spaced in the length direction of the first mounting plate. The free end of each of the piston rods is fixedly connected to one magnetic rod, and the piston rods are connected to the injector chamber in a movable and sealing manner through a sealing ring or a sealing washer.

Multiple loading heads are provided and are evenly spaced in the length direction of the injector chamber. The loading heads are fitted with the magnetic rods one by one, and the loading heads all load the magnetic separation sleeves and the tip heads using an interference fit.

By introducing the magnetic rods and the disposable magnetic separation sleeves, passive magnetic separation is changed into active magnetic separation, which greatly improves the separation speed and greatly simplifies the magnetic separation process. Since the magnetic field is closer to the magnetic particles and the magnetic adsorption is performed by reciprocating, the active magnetic separation design has higher separation efficiency and shorter separation time, which is far superior to passive magnetic separation. The multi-channel parallel separation further improves magnetic particle separation and transfer efficiency. The first drive device and the second drive device realize the reciprocating motion of the magnetic separation sleeves, which can complete the mixing of the reaction solution and the re-suspension of the cleaning solution. Therefore, the present disclosure has a simple structure and high reliability and avoids a liquid splash. The present disclosure realizes a multi-channel parallel pipetting function, which enables precise pipetting of the samples or reagent, thus eliminating the need for a complex pipetting structure. In addition, the present disclosure integrates pipetting, magnetic adsorption, transfer, mixing, and unloading functions, which greatly improves the degree of automation.

The second drive device drives the piston rods to linearly reciprocate in the vertical direction, and the piston rods drive the magnetic rods to linearly reciprocate inside the loading heads and the injector chamber. The design realizes the automatic separation and loading of the film breaking pieces, the magnetic separation sleeves, and the tip heads on the loading heads, which do not require additional mechanisms and has strong practicability. The present disclosure has the advantages of high performance, small volume, and automated pipetting, being applicable to point-of-care testing (POCT) products, and having great potential for expansion.

The multiple piston rods are connected to the injector chamber in a movable and sealing manner through a sealing ring or a sealing washer. The channels of the injector chamber in which the piston rods are connected form negative pressure. This design facilitates the automatic adsorption of the reagent by the tip heads by controlling the expansion and contraction of the piston rods, avoids the need for other adsorption devices and a liquid passage, and achieves a simple structure. When it is necessary to mix the reaction solution and re-suspend the cleaning solution, the first drive device and the second drive device drive the loading heads with the magnetic separation sleeves to move upward and downward. The design achieves a simple structure and high mixing efficiency and avoids liquid splashing that may be caused by eccentric mixing.

Further, the PMT assembly includes a second mounting plate provided on the support and a horizontal drive device. The horizontal drive device is configured to drive the second mounting plate to linearly reciprocate in an X-axis direction. The second mounting plate is provided with a PMT module and a vertical drive device configured to drive the PMT module to linearly reciprocate in a Z-axis direction.

Further, the support is provided thereon with a horizontal guide rail, and the second mounting plate is provided with a horizontal slider, which is provided with a sliding groove in a slidable fit with the horizontal guide rail.

The horizontal drive device includes a third motor provided on the back side of a horizontal beam. An output end of the third motor penetrates through the horizontal beam and is fixedly connected to a PMT driving pulley. The front side of the horizontal beam is provided with a PMT driven pulley. The PMT driven pulley is connected to the PMT driving pulley through a belt. The second mounting plate is provided with a second synchronous belt pressing plate in contact with the belt.

The second mounting plate has an L-shaped cross-section. The vertical drive device includes a fourth motor provided on top of the second mounting plate. The output end of the fourth motor penetrates through the top of the second mounting plate and is connected to a vertical lead screw through a coupling.

The second mounting plate is provided with a vertical guide rail, which is connected to a vertical slider in a slidable manner. The lead screw passes through the center of the vertical slider and is connected to the vertical slider in a threaded manner. The lead screw has a length that is fitted with the length of the vertical guide rail. The PMT module is connected to the front side of the vertical slider.

The horizontal drive device and the vertical drive device realize the linear reciprocation of the PMT module in the X-axis direction and the Z-axis direction, which greatly increases the moving range of the PMT module. Compared with the fixed PMT module in the traditional analyzer, the movable PMT module improves the degree of automation, omits the step of manually placing the reaction tube, greatly reduces the work intensity of the testing personnel, and improves testing efficiency. The horizontal drive device realizes the linear reciprocation of the PMT module in the X-axis direction through the belt drive with high efficiency, which improves the moving speed of the PMT module and thus improves the testing efficiency. The vertical drive device realizes the high-precision linear reciprocation of the PMT module in the Z-axis direction through the transmission of the lead screw. This design enables precise position adjustment of the PMT module, ensuring the stability of the PMT module during movement.

Further, the POCT fully-automatic chemiluminescence device includes an electrical assembly, a display module, and an image acquisition module. The electrical assembly includes a power supply configured to supply power to the entire POCT fully-automatic chemiluminescence device, a master switch configured to control connection and disconnection of the power supply, a main control drive board, and a temperature control board configured to control the temperature of the heating plate. The main control drive board is configured to control the start and stop of the reaction chamber stepping motor, the first motor, the second motor, the third motor, and the fourth motor.

The display module includes a host computer provided on the support and a touch display electrically connected to the host computer, and the touch display is electrically connected to the main control drive board.

The image acquisition module includes a reagent strip scanner and a camera. The camera is configured to acquire and transmit image information about reagent transfer, cleaning, and separation by the multi-channel parallel pretreatment assembly to the host computer, and the host computer transmits the received image information to the touch display.

The present disclosure has the following beneficial effects. The invention of the present disclosure does not require a liquid passage and has low maintenance costs and high reliability. The tip heads, the film breaking pieces, and the magnetic separation sleeves are disposables. They cooperate with the cleaning, separation, and pipetting components to realize automatic sample addition, support whole blood testing, and avoid carry-over. At present, the POCT chemiluminescence instruments supplied by Chinese manufacturers adopt manual sample addition, which is cumbersome and prone to human errors. The present disclosure adopts the single-serving reagent strip, which includes all the disposables, thereby simplifying the manual operation process.

Figure 1:
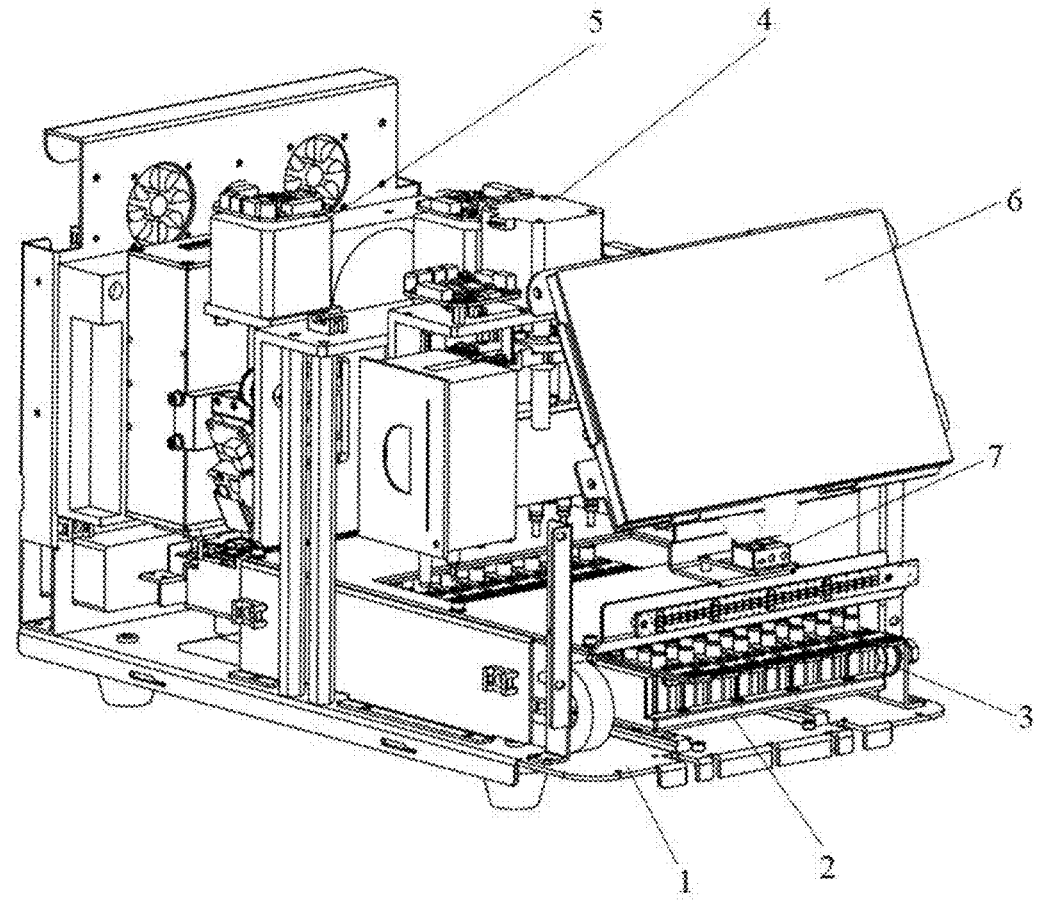
FIG. 1 is a three-dimensional structural view of a point-of-care testing (POCT) fully-automatic chemiluminescence device based on a multi-channel parallel pretreatment technology according to the present disclosure.

Reference Numerals: 1. support; 2. reaction chamber assembly; 201. guide rail; 202. reaction chamber stepping motor; 203. base; 204. reaction chamber driving pulley; 205. reaction chamber driven pulley; 206. reaction chamber body; 207. reaction chamber slider; 208. first synchronous belt pressing plate; 209. photoelectric switch; and 210. heating plate;

3. reagent strip; 301. handle; 302. tip head; 303. disposable magnetic separation sleeve; 304. disposable film breaking piece; 305. first diluent hole; 306. second diluent hole; 307. magnetic bead hole; 308. first reagent hole; 309. second reagent hole; 310. third reagent hole; 311. first cleaning solution hole; 312. second cleaning solution hole; 313. third cleaning solution hole; 314. fourth cleaning solution hole; and 315. substrate reading hole;

4. multi-channel parallel pretreatment assembly; 401. second mounting bracket; 402. injector chamber; 403. first mounting plate; 404. piston rod; 405. loading head; 406. magnetic rod; 407. first mounting bracket; 408. first motor; 409. first drive screw; 410. first linear guide rail; 411. slider; 412. second motor; 413. second drive screw; and 414. second linear guide rail;

5. photomultiplier tube (PMT) assembly; 501. second mounting plate; 502. PMT module; 503. horizontal guide rail; 504. horizontal slider; 505. third motor; 506. PMT driving pulley; 507. PMT driven pulley; 508. second synchronous belt pressing plate; 509. fourth motor; 510. lead screw; 512. vertical guide rail; and 513. vertical slider; and

6. touch display; and 7. reagent strip scanner.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure as defined by the appended claims should fall within the protection scope of the present disclosure.

Figure 2:
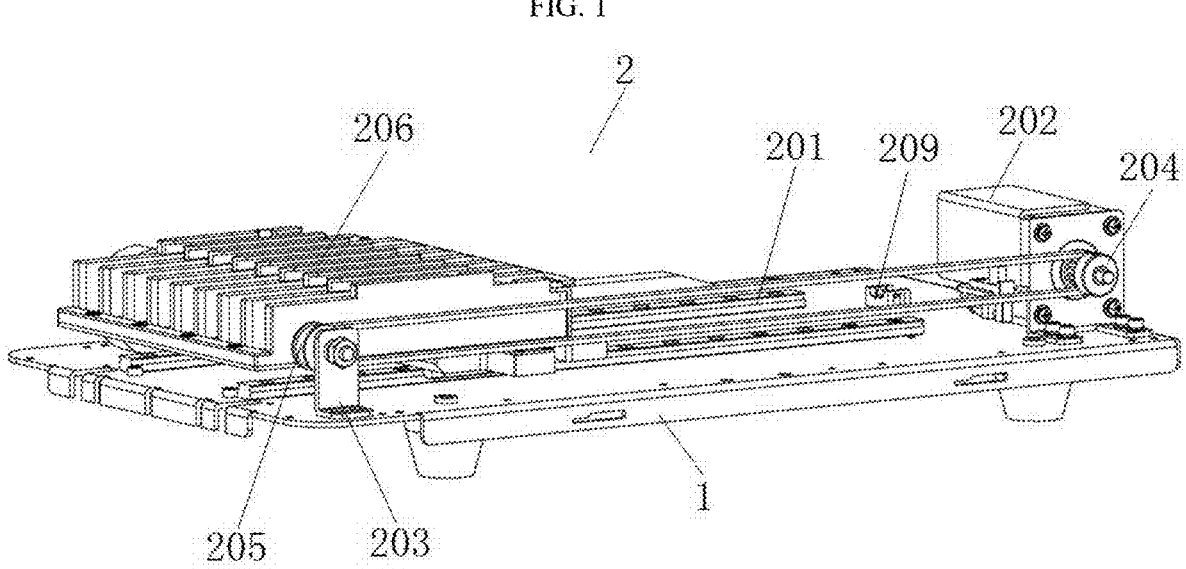
FIG. 2 is a structural view of a reaction chamber assembly provided on a support.
Figure 3:
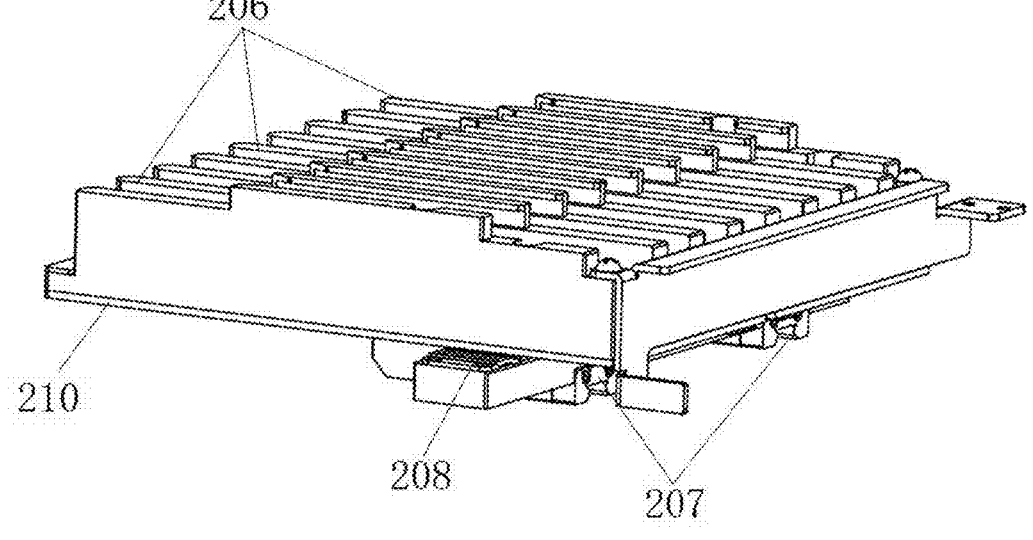
FIG. 3 is a structural view of a reaction chamber body.
Figure 4:
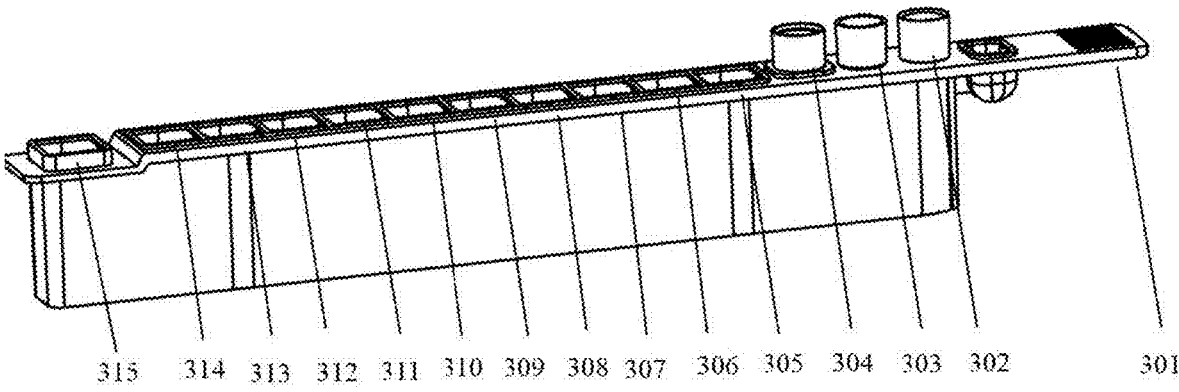
FIG. 4 is a structural view of a reagent strip.
Figure 5:
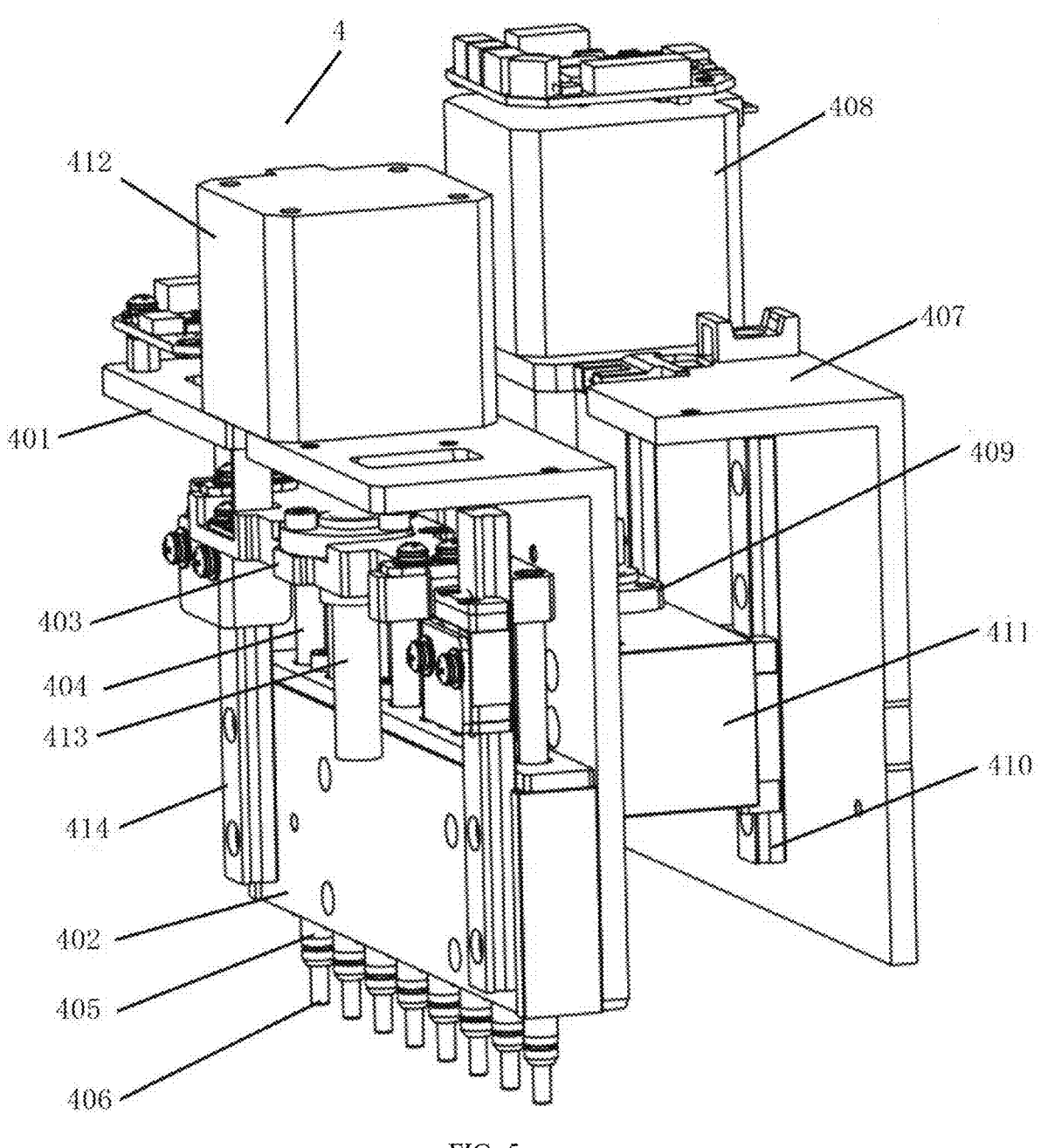
FIG. 5 is a structural view of a multi-channel parallel pretreatment assembly.
Figure 6:
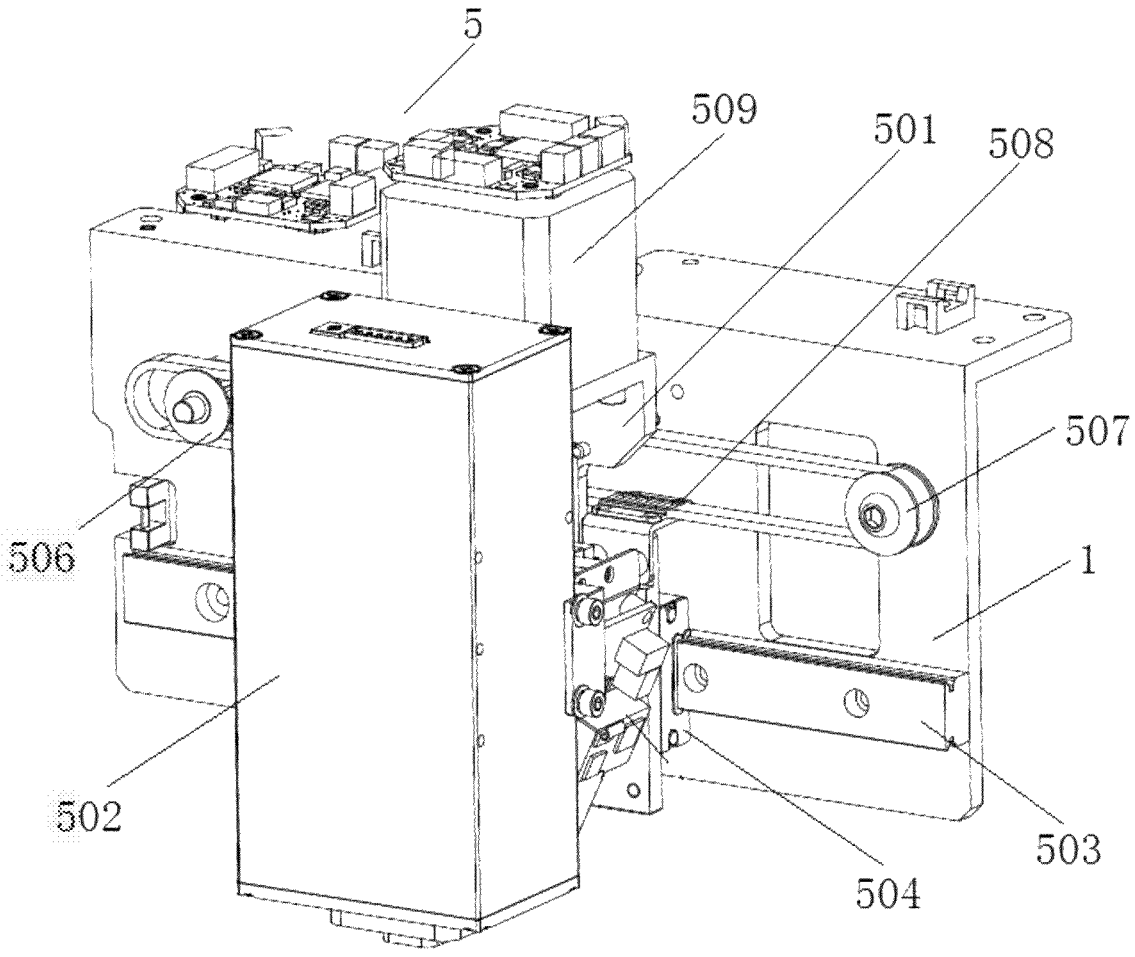
FIG. 6 is a structural view of a photomultiplier tube (PMT) assembly.
Figure 7:
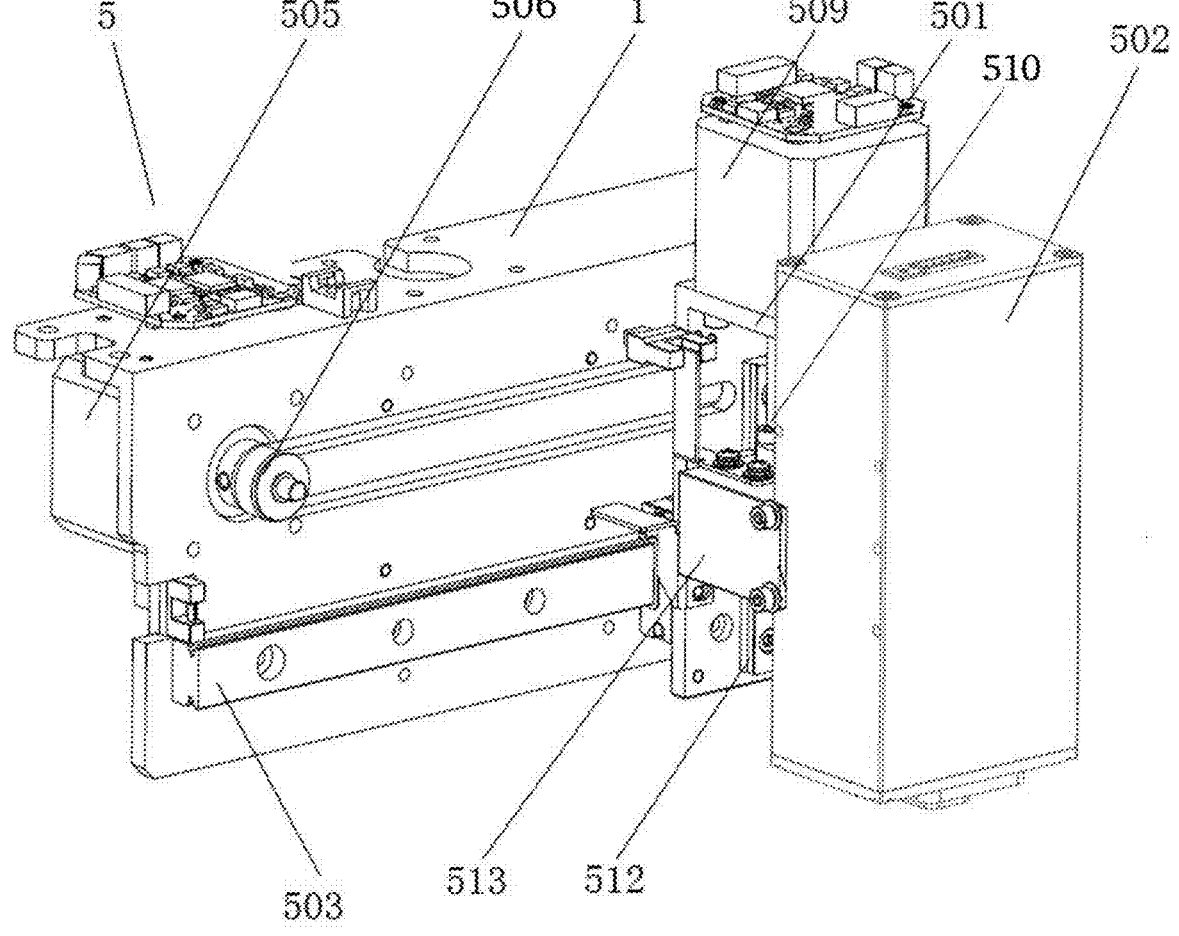
FIG. 7 is a back view of the PMT assembly.

As shown in FIGS. 1 to 7, the point-of-care testing (POCT) fully-automatic chemiluminescence device based on a multi-channel parallel pretreatment technology includes support 1. The support 1 is provided with reaction chamber assembly 2 configured to accommodate reagent strips 3. The reaction chamber assembly 2 reciprocates linearly relative to the support 1. Multi-channel parallel pretreatment assembly 4 and photomultiplier tube (PMT) assembly 5 are sequentially arranged on the support 1 from front to back. The multi-channel parallel pretreatment assembly 4 and the PMT assembly 5 are located above the reaction chamber assembly 2. The multi-channel parallel pretreatment assembly 4 is configured to transfer, clean, and separate reagents in the reagent strips 3 in the reaction chamber assembly 2. The reaction chamber assembly 2 transfers the cleaned and separated reagents to the PMT assembly 5. The PMT assembly 5 is configured to detect a luminescence value of the cleaned and separated reagents.

Further, as a specific implementation of the reaction chamber assembly 2, the reaction chamber assembly 2 includes guide rail 201 provided at the bottom of the support 1. Two sides of the guide rail 201 are respectively provided with reaction chamber stepping motor 202 and base 203. The reaction chamber stepping motor 202 and the base 203 are fixedly connected to the support 1.

An output end of the reaction chamber stepping motor 202 is provided with reaction chamber driving pulley 204. A reaction chamber driven pulley 205 is rotatably provided on the base 203. The reaction chamber driving pulley 204 is connected to the reaction chamber driven pulley 205 through a belt.

The guide rail 201 is provided thereon with reaction chamber body 206. The bottom of the reaction chamber body 206 is provided with reaction chamber slider 207 that is connected to the guide rail 201 in a slidable manner. A side wall of the reaction chamber body 206 is provided with first synchronous belt pressing plate 208 in contact with the belt. The belt drives the reaction chamber body 206 to slide along the length direction of the guide rail 201 through the first synchronous belt pressing plate 208.

The reaction chamber stepping motor 202 drives the belt to linearly reciprocate on the reaction chamber driving pulley and the reaction chamber driven pulley through PMT driving pulley 506 and PMT driven pulley 507. The linearly reciprocating belt is in contact with the first synchronous belt pressing plate 208 to drive the reaction chamber body 206 to reciprocate slidably on the base 203. The reaction chamber stepping motor is controlled to drive the reaction chamber body 206 to a designated position to drive the reagent strip 3 in the reaction chamber body 206 to move to a position where the multi-channel parallel pretreatment assembly 4 is located. This design facilitates a tip head 302 to take a liquid and improves the testing efficiency.

Photoelectric switch 209 is provided on the bottom of the support 1 and is configured to detect the position of the reaction chamber body 206 in real-time. Heating plate 210 is provided at the bottom of the reaction chamber body 206, and the heating plate 210 heats at a constant temperature of 37° C. The heating plate 210 keeps the temperature in the reaction chamber body 206 constant to the preset value, such that the reagent or solvent in the reagent strip 3 meets the temperature condition for chemiluminescence measurement.

Further, as a specific implementation of the reagent strip 3, the reagent strip 3 is provided with handle 301. The tip head 302, disposable magnetic separation sleeve 303, and disposable film breaking piece 304 are arranged beside the handle 301. The reagent strip 3 is provided with first diluent hole 305, second diluent hole 306, magnetic bead hole 307, first reagent hole 308, second reagent hole 309, third reagent hole 310, first cleaning solution hole 311, second cleaning solution hole 312, third cleaning solution hole 313, fourth cleaning solution hole 314 and substrate reading hole 315 side by side.

After the relevant reagents are encapsulated in the holes of the reagent strip 3, an aluminum film is heat-sealed on the surface of the reagent strip. A two-dimensional code is engraved on the surface of the aluminum film, including a reagent code and a batch number, which is convenient for the automatic identification of reagent information. The handle is convenient for a user to take and place the reagent strip 3. The tip head 302 is configured for the automatic transfer of a sample or reagent. The disposable magnetic separation sleeve 303 is configured to perform magnetic bead adsorption, mixing, and transfer. The disposable film breaking piece 304 is configured to break through the aluminum film on the surface of each hole of the reagent strip 3. The first diluent hole 305 and the second diluent hole 306 are configured to perform dilution of the sample. The magnetic bead hole 307 is configured to encapsulate a magnetic bead component of the reagent. The first reagent hole 308, the second reagent hole 309, and the third reagent hole 310 are configured to encapsulate the remaining reagent components. The first cleaning solution hole 311, the second cleaning solution hole 312, the third cleaning solution hole 313, and the fourth cleaning solution hole 314 are configured to perform cleaning of magnetic beads. The substrate reading hole 315 is configured to encapsulate a substrate for reaction and read the luminescence value.

Further, the multi-channel parallel pretreatment assembly 4 includes a magnetic separation and transfer device configured to perform separation and transfer and a first drive device configured to drive the magnetic separation and transfer device to move.

The magnetic separation and transfer device comprises a second mounting bracket 401 fixedly connected to the support 1. The second mounting bracket 401 is provided therein with an injector chamber 402. A first mounting plate 403 is provided above the top of the injector chamber 402 and is provided with piston rods 404 that are connected to the injector chamber 402 in a movable and sealing manner. The second mounting bracket 401 is further provided with a second drive device that is configured to drive the first mounting plate 403 to linearly reciprocate in a vertical direction.

The injector chamber 402 is provided with loading heads 405, which are configured to load tip heads 302 or magnetic separation sleeves 303 and have a hollow structure. The piston rods 404 have free ends that are fixedly connected to magnetic rods 406 that are configured to adsorb magnetic beads in a magnetic particle reagent. The second drive device can drive the magnetic rods 406 on the piston rods 404 to pass through the loading heads 405.

Further, the first drive device includes a first mounting bracket 407, which is provided thereon with a first motor 408. An output end of the first motor 408 is provided with a first drive screw 409. The first mounting bracket 407 is further vertically provided with a first linear guide rail 410. The first linear guide rail 410 is connected to a slider 411 in a slidable manner. The slider 411 is fixedly connected to the second mounting bracket 401. The first drive screw 409 is connected to the slider 411 in a threaded manner.

The second drive device includes a second motor 412 provided on the second mounting bracket 401. An output end of the second motor 412 is provided with a second drive screw, which is connected to the first mounting plate 403 in a threaded manner. The injector chamber 402 is vertically provided with a second linear guide rail 414 that is connected to the first mounting plate 403 in a slidable manner.

There are multiple piston rods 404, which are evenly spaced in the length direction of the first mounting plate 403. The free end of each of the piston rods 404 is fixedly connected to one magnetic rod 406. The piston rods 404 are connected to the injector chamber 402 in a movable and sealing manner through a sealing ring or a sealing washer.

There are multiple loading heads 405, which are evenly spaced in the length direction of the injector chamber 402. The loading heads 405 are fitted with the magnetic rods 406 one by one. The loading heads 405 all load the magnetic separation sleeves 303 and the tip heads 302 using an interference fit.

By introducing the magnetic rods 406 and the disposable magnetic separation sleeves 303, passive magnetic separation is changed into active magnetic separation, which greatly improves the separation speed and greatly simplifies the magnetic separation process. Since the magnetic field is closer to the magnetic particles and the magnetic adsorption is performed by reciprocating, the active magnetic separation design has higher separation efficiency and shorter separation time, which is far superior to passive magnetic separation. The multi-channel parallel separation further improves magnetic particle separation and transfer efficiency. The first drive device and the second drive device realize the reciprocating motion of the magnetic separation sleeves 303, which can complete the mixing of the reaction solution and the re-suspension of the cleaning solution. Therefore, the present disclosure has a simple structure and high reliability and avoids a liquid splash. The present disclosure realizes a multi-channel parallel pipetting function, which enables precise pipetting of the samples or reagent, thus eliminating the need for a complex pipetting structure. In addition, the present disclosure integrates pipetting, magnetic adsorption, transfer, mixing, and unloading functions, which greatly improves the degree of automation.

The second drive device drives the piston rods 404 to linearly reciprocate in the vertical direction, and the piston rods 404 drive the magnetic rods 406 to linearly reciprocate inside the loading heads 405 and the injector chamber 402. The design realizes the automatic separation and loading of the magnetic separation sleeves 303 and the tip heads 302 on the loading heads 405, which does not require additional mechanisms and has strong practicability. The present disclosure has the advantages of high performance, small volume, and automated pipetting, being applicable to point-of-care testing (POCT) products, and having great potential for expansion.

The multiple piston rods 404 are connected to the injector chamber 402 in a movable and sealing manner through a sealing ring or a sealing washer. The channels of the injector chamber 402 in which the piston rods 404 are connected form negative pressure. This design facilitates the automatic adsorption of the reagent by the tip heads 302 by controlling the expansion and contraction of the piston rods 404, does not require other adsorption devices and a liquid passage, and achieves a simple structure. When it is necessary to mix the reaction solution and re-suspend the cleaning solution, the first drive device and the second drive device drive the loading heads 405 with the tip heads 302 and the magnetic separation sleeves 303 to move upward and downward. The design achieves a simple structure and high mixing efficiency and avoids liquid splashing that may be caused by eccentric mixing.

A magnetic separation process of the multi-channel parallel pretreatment assembly is as follows. The first motor 408 drives the first drive screw 409 to rotate, and the rotated first drive screw 409 drives the slider 411 to move the second mounting bracket 401 downward. The loading heads 405 of the injector chamber 402 are provided with the magnetic separation sleeves 303. The loading heads 405 and the magnetic separation sleeves 303 are in an interference fit, and the magnetic separation sleeves 303 are loaded by frictional force. When the second mounting bracket 401 is descended to a fixed height, the loading of the magnetic separation sleeves 303 on the loading heads 405 is complete. After the loading of the magnetic separation sleeves 303 is complete, the first motor 408 is controlled to reverse, such that the second mounting bracket 401 is ascended to the highest position. The second motor 412 is rotated to move the first mounting plate 403 downward through the second drive screw. The downward moving first mounting plate 403 drives the piston rods 404 and the magnetic rods 406 to move downward. When the magnetic rods 406 reach the bottoms of the magnetic separation sleeves, the second motor 412 is stopped. The first motor 408 is controlled to rotate and drive the second mounting bracket 401 to move downward. When the magnetic separation sleeves 303 come into contact with a magnetic particle liquid, the magnetic separation sleeves are descended slowly until the bottom of the magnetic particle liquid is reached. In this way, the magnetic particles are gradually captured at the ends of the magnetic separation sleeves 303. Multiple slow ascents or descents may be performed to fully complete the adsorption and separation of the magnetic particles. After the adsorption and separation are completed, the first motor 408 is controlled to drive the second mounting bracket 401 to ascend to the topmost end. All the magnetic particles are adsorbed at the ends of the outer walls of the magnetic separation sleeves 303. The separated liquid is pumped away, and a new cleaning solution is refilled or a supporting reagent strip 3 is moved, such that the magnetic separation sleeves 303 are above the new cleaning solution. At this time, the magnetic particles need to be suspended in the cleaning solution again for cleaning. The first motor 408 is rotated to cause the second mounting bracket 401 to move down again until the magnetic separation sleeves 303 enter the cleaning solution. The second motor 412 is rotated to drive the piston rods 404, such that the magnetic rods 406 are driven to move upward until the magnetic rods 406 are completely separated from the interior of the loading heads 405. The magnetic field disappears, and the magnetic particles are slowly detached from the ends of the magnetic separation sleeves 303. To speed up this process, the first motor can drive the second mounting bracket 401 to reciprocate up and down through different frequencies to ensure that the magnetic particles are fully mixed with the cleaning solution and suspended. After this process is completed, the first motor 408 drives the second mounting bracket 401 to ascend to the highest position again. So far, one cycle of magnetic separation, cleaning, and mixing has been completed. If another cycle is required, the above operations are repeated.

The multi-channel parallel pretreatment assembly can also be used to transfer the magnetic particles into a reagent for mixing, separate the magnetic particles in the reaction solution into the cleaning solution, or transfer the magnetic particles into a substrate solution for reaction and complete luminescence testing. After all separation actions are complete, the magnetic separation sleeves 303 are unloaded. The second motor 412 drives the piston rods 404 and the magnetic rods 406 to move downward. When the magnetic rods 406 reach the bottoms of the magnetic separation sleeves 303, the magnetic rods 406 continue to move downward until all the magnetic separation sleeves 303 are pushed out by the magnetic rods 406 and are separated from the loading heads 405.

A reagent transfer process of the multi-channel parallel pretreatment assembly is as follows. The reaction chamber is moved to a designated position. The first motor 408 is rotated to drive the second mounting bracket 401 to move downward through the slider 411. The second mounting bracket 401 is provided with the loading heads 405 fitted with the tip heads 302. The loading heads 405 and the fitted tip heads 302 are in an interference fit, and the tip heads 302 are loaded by frictional force. When the second mounting bracket 401 is descended to a fixed height, the loading of the fitted tip heads 302 is complete. After the loading is complete, the second mounting bracket 401 is ascended to the highest position. The first motor 408 drives the second mounting bracket 401 to descend to a fixed height. The front ends of the tip heads 302 of the injector chamber 402 with the tip heads 302 are located below the liquid level of the sample or reagent. The second motor 412 is rotated to drive the piston rods 404 to move upward through the first mounting plate. Since the injector chamber 402 is a closed chamber, the sample or reagent is sucked into the tip heads 302 by the tip heads 302 under the action of negative pressure. The first motor 408 drives the second mounting bracket 401 to ascend until the tip heads 302 are removed from the liquid level of the sample or reagent. The fitted reagent strip 3 is moved to the desired hole position, and the tip heads 302 are directly above the target hole position. The first motor 408 drives the second mounting bracket 401 to move downward, and the tip heads 302 are driven to run until below the liquid level. The second motor 412 drives the first mounting plate 403 to move downward, and the first mounting plate 403 drives the piston rods 404 to move downward. Under the action of pressure, the sample or reagent in cavities of the tip heads 302 is injected into the target hole position. The first motor 408 drives the second mounting bracket 401 to cause the injector chamber 402 to ascend and separate from the reagent, thereby realizing the automatic transfer of the sample or reagent. Then the piston rods 404 are moved downward, and the magnetic rods 406 are moved downward accordingly. After being moved downward for a fixed distance, the magnetic rods 406 contact filter plugs in the cavities of the fitted tip heads 302. The magnetic rods 406 are continuously moved downward, and the tip heads 302 are separated from the loading heads 405 to realize the unloading of the tip heads 302. If multiple pipetting is required, the tip heads 302 are loaded, and the suction and discharge actions are repeated. The pipetting volume can be 5-1,000 μl. The multi-channel parallel pre-treatment assembly can also be applied for reagent mixing. The tip heads 302 repeatedly suck and discharge below the liquid level to fully mix the reagent or sample.

When it is necessary to mix the reaction solution and re-suspend the cleaning solution, the first drive device and the second drive device drive the loading heads 405 with the magnetic separation sleeves 303 to move upward and down-ward. The design achieves a simple structure, and high mixing efficiency and avoids liquid splashing that may be caused by eccentric mixing.

There are multiple piston rods 404. The multiple piston rods 404 are evenly spaced in the length direction of the first mounting plate 403. One magnetic rod 406 is fixedly con-nected to the free end of each piston rod 404. There are multiple loading heads 405. The multiple loading heads 405 are evenly spaced in the length direction of the injector chamber 402. The magnetic rods 406 are fitted with the loading heads 405 one by one. By introducing the magnetic rods 406 and the disposable magnetic separation sleeves 303, passive magnetic separation is changed into active magnetic separation, which greatly improves the separation speed and greatly simplifies the magnetic separation pro-cess. Since the magnetic field is closer to the magnetic particles and the magnetic adsorption is performed by recip-rocating, the active magnetic separation design has higher separation efficiency and shorter separation time, which is far superior to passive magnetic separation. The multi-channel parallel separation further improves the magnetic particle separation and transfer efficiency. The first drive device and the second drive device realize the reciprocating motion of the magnetic separation sleeves 303, which can complete the mixing of the reaction solution and the re-suspension of the cleaning solution. Therefore, the present disclosure has a simple structure and high reliability and avoids a liquid splash. The present disclosure realizes a multi-channel parallel pipetting function, which enables precise pipetting of the samples or reagent, thus eliminating the need for a complex pipetting structure. In addition, the present disclosure integrates pipetting, magnetic adsorption, transfer, mixing, and unloading functions, which greatly improves the degree of automation.

Further, the PMT assembly 5 includes second mounting plate 501 provided on the support 1 and a horizontal drive device. The horizontal drive device is configured to drive the second mounting plate 501 to linearly reciprocate in an X-axis direction. The second mounting plate 501 is provided with PMT module 502 and a vertical drive device configured to drive the PMT module 502 to linearly reciprocate in a Z-axis direction.

Further, the support 1 is provided thereon with horizontal guide rail 503. Horizontal slider 504 is provided on the second mounting plate 501. The horizontal slider 504 is provided with a sliding groove that is in a slidable fit with the horizontal guide rail 503.

The horizontal drive device includes third motor 505 provided on the back side of a horizontal beam. An output end of the third motor 505 penetrates the horizontal beam and is fixedly connected to the PMT driving pulley 506. A front side of the horizontal beam is provided with the PMT driven pulley 507. The PMT driven pulley 507 is connected to the PMT driving pulley 506 through a belt. The second mounting plate 501 is provided with second synchronous belt pressing plate 508 in contact with the belt.

The second mounting plate 501 has an L-shaped cross-section. The vertical drive device includes fourth motor 509 provided on the top of the second mounting plate 501. An output end of the fourth motor 509 penetrates through the top of the second mounting plate 501 and is connected to vertical lead screw 510 through a coupling.

The second mounting plate 501 is provided with a vertical guide rail 512. The vertical guide rail 512 is connected to a vertical slider in a slidable manner. The lead screw 510 passes through the center of the vertical slider and is connected to the vertical slider in a threaded manner. The lead screw 510 has a length that is fitted with the length of the vertical guide rail. The PMT module 502 is connected to the front side of the vertical slider.

The horizontal drive device and the vertical drive device realize the linear reciprocation of the PMT module 502 in the X-axis direction and the Z-axis direction, which greatly increases the moving range of the PMT module 502. Com-pared with the fixed PMT module in the traditional analyzer, the movable PMT module 502 improves the degree of automation, omits the step of manually placing the reaction tube, greatly reduces the work intensity of the testing personnel, and improves testing efficiency. The horizontal drive device realizes the linear reciprocation of the PMT module 502 in the X-axis direction through the belt drive with high efficiency, which improves the moving speed of the PMT module 502 and thus improves the testing effi-ciency. The vertical drive device realizes the high-precision linear reciprocation of the PMT module 502 in the Z-axis direction through the transmission of the lead screw 510. This design enables precise position adjustment of the PMT module 502, ensuring the stability of the PMT module 502 during movement.

Further, the POCT fully-automatic chemiluminescence device includes an electrical assembly, a display module, and an image acquisition module. The electrical assembly includes a power supply configured to supply power to the entire POCT fully-automatic chemiluminescence device, a master switch configured to control connection and disconnection of the power supply, a main control drive board, and a temperature control board configured to control the temperature of the heating plate 210. The main control drive board is configured to control the start and stop of the reaction chamber stepping motor 202, the first motor 408, the second motor 412, the third motor 505, and the fourth motor 509.

The display module includes a host computer provided on the support 1 and touch display 6 electrically connected to the host computer. The touch display 6 is electrically connected to the main control drive board.

The image acquisition module includes a reagent strip scanner 7 and a camera. The camera is configured to acquire and transmit image information about reagent transfer, cleaning, and separation by the multi-channel parallel pretreatment assembly 4 to the host computer. The host computer transmits the received image information to the touch display 6. The scanner 7 is configured to read curve information and other data of the reagent.

In the operation of the POCT fully-automatic chemiluminescence device based on a multi-channel parallel pretreatment technology, the camera monitors in real-time whether the film breaking piece is successfully loaded, whether the film breaking process is smooth, whether the film breaking piece is successfully unloaded, whether the magnetic separation sleeve 303 is successfully loaded, whether the transfer process of the magnetic separation sleeve 303 is smooth, whether the magnetic separation sleeve 303 is successfully unloaded, whether the tip head 302 is successfully loaded, whether the pipetting process of the tip head 302 is smooth, and whether the tip head 302 is successfully unloaded. After the tip head 302 draws the sample, the visual recognition camera can determine whether the sample type is serum or whole blood and further assist in determining the hematocrit (HCT) of the whole blood sample.

After the reaction is completed, the reaction chamber is moved to a designated position. The PMT assembly 5 moves in the X-axis and Y-axis directions and drives the PMT module 502 to read the luminescence value. Finally, the test results are uploaded to the host computer and are displayed after being processed by software.

What is claimed is:

1. A point-of-care testing (POCT) fully-automatic chemiluminescence device based on a multi-channel parallel pretreatment technology, comprising a support;

a reaction chamber assembly provided on the support and configured to accommodate reagent strips, wherein the reaction chamber assembly comprises a guide rail provided at a bottom of the support; two sides of the guide rail are respectively provided with a reaction chamber stepping motor and a base, and the reaction chamber stepping motor and the base are fixedly connected to the support;

an output end of the reaction chamber stepping motor is provided with a reaction chamber driving pulley, and the base is provided with a reaction chamber driven pulley; and the reaction chamber driving pulley is connected to the reaction chamber driven pulley through a first belt;

a reaction chamber body is provided on the guide rail;

a bottom of the reaction chamber body is provided with a reaction chamber slider, wherein the reaction chamber slider is connected to the guide rail in a slidable manner;

a side wall of the reaction chamber body is provided with a first synchronous belt pressing plate configured to be in contact with the first belt; and the belt drives the reaction chamber body to slide in a length direction of the guide rail through the first synchronous belt pressing plate; and a multi-channel parallel pretreatment assembly and a photomultiplier tube (PMT) assembly sequentially arranged on the support from front to back, wherein the multi-channel parallel pretreatment assembly and the PMT assembly are located above the reaction chamber assembly;

the multi-channel parallel pretreatment assembly comprises a magnetic separation and transfer device configured to perform separation and transfer and a first drive device configured to drive the magnetic separation and transfer device to move;

the magnetic separation and transfer device comprises a second mounting bracket;

the second mounting bracket is provided with an injector chamber having a closed chamber;

a first mounting plate is provided at a top of the injector chamber, and the first mounting plate is provided with multiple piston rods, wherein the piston rods are connected to the injector chamber in a movable and sealing manner;

each piston rod cooperates with the injector chamber to define an independent, sealed metering cylinder configured to generate negative pressure for aspiration of a sample or reagent; and the second mounting bracket is further provided with a second drive device, wherein the second drive device is configured to drive the first mounting plate to linearly reciprocate in a vertical direction;

the injector chamber is provided with loading heads, wherein each loading head has a hollow interior structure dimensioned to sequentially and interchangeably receive, by interference fit, a disposable film breaking piece, a disposable magnetic separation sleeve, and a tip head configured to receive the sample or reagent; and free ends of the piston rods are fixedly connected to magnetic rods, wherein the magnetic rods are configured to adsorb magnetic beads in a magnetic particle reagent; and the second drive device is configured to drive the magnetic rods on the piston rods to pass through the loading heads; and wherein the multi-channel parallel pretreatment assembly is configured to transfer, clean, and separate reagents in the reagent strips in the reaction chamber assembly to obtain cleaned and separated reagents;

the reaction chamber assembly transfers the cleaned and separated reagents to the PMT assembly; and the PMT assembly is configured to detect a luminescence value of the cleaned and separated reagents; and wherein the reagent strips each are provided with a handle;

a tip head, a disposable magnetic separation sleeve, and a disposable film breaking piece are arranged beside the handle; and the reagent strips each are provided with a first diluent hole, a second diluent hole, a magnetic bead hole, a first reagent hole, a second reagent hole, a third reagent hole, a first cleaning solution hole, a second cleaning solution hole, a third cleaning solution hole, a fourth cleaning solution hole, and a substrate reading hole side by side.

2. The POCT fully-automatic chemiluminescence device according to claim 1, wherein a photoelectric switch is provided on the bottom of the support and is configured to detect a position of the reaction chamber body; and a heating plate is provided at the bottom of the reaction chamber body, and the heating plate heats at a constant temperature of 37° C.

3. The POCT fully-automatic chemiluminescence device according to claim 1, wherein the first drive device comprises a first mounting bracket, and a first motor is provided on the first mounting bracket; an output end of the first motor is provided with a first drive screw; the first mounting bracket is further vertically provided with a first linear guide rail; the first linear guide rail is connected to a slider in a slidable manner; the slider is fixedly connected to the second mounting bracket; and the first drive screw is connected to the slider in a threaded manner;

the second drive device comprises a second motor provided on the second mounting bracket; an output end of the second motor is provided with a second drive screw, wherein the second drive screw is connected to the first mounting plate in a threaded manner; and the injector chamber is vertically and fixedly provided with a second linear guide rail, wherein the second linear guide rail is configured to be connected to the first mounting plate in a slidable manner;

multiple piston rods are provided and are evenly spaced in a length direction of the first mounting plate; the free end of each of the piston rods is fixedly connected to one magnetic rod; and the piston rods are connected to the injector chamber in a movable and sealing manner through a sealing ring or a sealing washer; and multiple loading heads are provided and are evenly spaced in a length direction of the injector chamber; the loading heads are fitted with the magnetic rods one by one; and the loading heads each load the disposable film breaking piece, the disposable magnetic separation sleeve, and the tip head by using an interference fit.

4. The POCT fully-automatic chemiluminescence device according to claim 3, wherein the PMT assembly comprises a second mounting plate provided on the support, and a horizontal drive device; the horizontal drive device is configured to drive the second mounting plate to linearly reciprocate in an X-axis direction; and the second mounting plate is provided with a PMT module and a vertical drive device, wherein the vertical drive device is configured to drive the PMT module to linearly reciprocate in a Z-axis direction.

5. The POCT fully-automatic chemiluminescence device according to claim 4, wherein the support is provided with a horizontal guide rail, and the second mounting plate is provided with a horizontal slider, wherein the horizontal slider is provided with a sliding groove in slidable fit with the horizontal guide rail;

the horizontal drive device comprises a third motor provided on a back side of a horizontal beam; an output end of the third motor penetrates through the horizontal beam, and the output end of the third motor is fixedly connected to a PMT driving pulley; a front side of the horizontal beam is provided with a PMT driven pulley; the PMT driven pulley is connected to the PMT driving pulley through a second belt; and the second mounting plate is provided with a second synchronous belt pressing plate configured to be in contact with the second belt;

the second mounting plate has an L-shaped cross-section; the vertical drive device comprises a fourth motor provided at a top of the second mounting plate; and an output end of the fourth motor penetrates through the top of the second mounting plate, and the output end of the fourth motor is connected to a vertical lead screw through a coupling; and the second mounting plate is provided with a vertical guide rail, and the vertical guide rail is connected to a vertical slider in a slidable manner; the vertical lead screw passes through a center of the vertical slider, and the vertical lead screw is connected to the vertical slider in a threaded manner; a length of the vertical lead screw is fitted with a length of the vertical guide rail; and the PMT module is connected to a front side of the vertical slider.

\* \* \* \* \*